United States Patent [19]
Halldin et al.

[11] Patent Number: 5,917,065
[45] Date of Patent: Jun. 29, 1999

[54] CYCLONE

[75] Inventors: Claes Halldin, Gemla; Lars-Erik Johansson, Älmeboda; Heikki Salo, Växjö, all of Sweden

[73] Assignee: ABB Fläkt AB, Stockholm, Sweden

[21] Appl. No.: 08/952,449

[22] PCT Filed: May 30, 1995

[86] PCT No.: PCT/SE95/00607

§ 371 Date: Nov. 20, 1997

§ 102(e) Date: Nov. 20, 1997

[87] PCT Pub. No.: WO96/38231

PCT Pub. Date: Dec. 5, 1996

[51] Int. Cl.$^6$ ............................................. B01D 45/12
[52] U.S. Cl. ............................................. 55/459.1; 96/384
[58] Field of Search .................... 55/459.1, 459.2, 55/459.3, 459.4, 459.5, 460; 96/384, 385, 388

[56] References Cited

U.S. PATENT DOCUMENTS

| | | | |
|---|---|---|---|
| 1,265,763 | 5/1918 | Fender | 55/459.1 |
| 2,034,023 | 3/1936 | Cheltnam et al. | 55/459.1 |
| 3,405,803 | 10/1968 | Bahr et al. | 55/459.1 |
| 3,970,335 | 7/1976 | Curington et al. | 285/133 A |
| 4,842,145 | 6/1989 | Boadway . | |

FOREIGN PATENT DOCUMENTS

| | | | |
|---|---|---|---|
| 1314386 | 12/1962 | France | 55/459.1 |
| 926647 | 4/1955 | Germany . | |
| 1507817 A1 | 1/1970 | Germany . | |
| 2224458 | 8/1973 | Germany | 55/459.1 |
| 1519781 | 2/1987 | Russian Federation | 55/459.1 |

*Primary Examiner*—Jay H. Woo
*Assistant Examiner*—Robert Hopkins
*Attorney, Agent, or Firm*—Burns, Doane, Swecker & Mathis, L.L.P.

[57] ABSTRACT

A cyclone for treating a gas flow (F) containing dust comprises a cyclone chamber (1) of circular cross section and having a vertical axis, and a central tube (7) of circular cross section, which is coaxially arranged in the upper portion of the cyclone chamber (1). An elongated insert element (10), which is vertically inserted in the central tube (7), is so designed and extends in such a manner downwards in the central tube (7) from the upper end thereof that a circumferential gap (17) exists between the insert element (10) and the central tube (7). This gap (17) has a preferably constant cross-sectional area which does not increase in the direction of the gas flow.

20 Claims, 1 Drawing Sheet

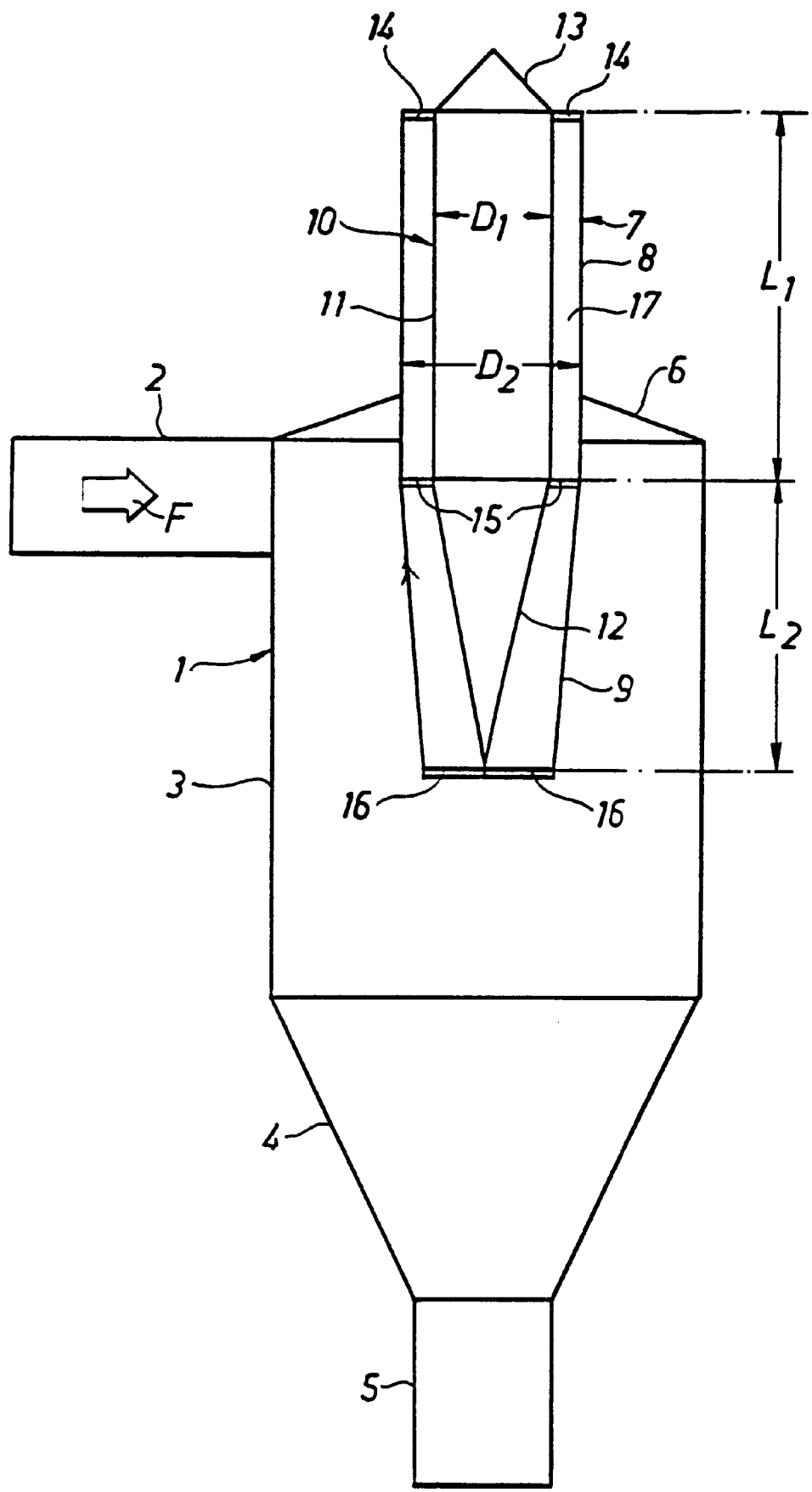

CYCLONE

The present invention relates to a cyclone for treating a gas flow containing dust, said cyclone having a cyclone chamber of circular cross-section and a vertical axis, said chamber having a gas flow inlet for substantially horizontal injection of the gas flow into the cyclone chamber, and a lower dust outlet for removing dust, which is separated from the gas flow in the cyclone chamber, and a central tube of circular cross-section, which is coaxially arranged in the upper portion of the cyclone chamber and whose lower end forms a lower gas flow inlet and whose upper end forms an upper gas flow outlet.

A cyclone of this type is used as, for example, dust separator in plants for drying paper pulp or some other fibrous pulp, an air flow containing particles, such as fibres, being passed through the cyclone so as to be relieved of particles.

In operation, the cyclone is subjected to strong vibrations, which, especially if the cyclone is large, may cause its shaking to pieces. These vibrations are probably caused by a flow phenomenon which is called PVC (Precessing Vortex Core) and is described in more detail by A K Gupta, D G Lilley and N Syred in "Swirl Flows", pp 191–198, published in 1984 by ABACUS PRESS, Massachusetts, USA.

The object of the present invention is to provide a cyclone, in which the PVC phenomenon and, thus, the problem of vibrations are eliminated or at least reduced to a considerable extent.

According to the invention, this object is achieved by a cyclone, which is of the type mentioned by way of introduction and characterised in that an elongate insert element, which is vertically inserted in the central tube, is so designed and extends in such a manner downwards in the central tube from the upper end thereof that a circumferential gap exists between the insert element and the central tube, said gap having a preferably constant cross-sectional area that does not increase in the direction of the gas flow.

In a preferred embodiment, the insert element projects a distance above the central tube.

Preferably, the insert element extends down to the lower end of the central tube.

In a preferred embodiment, the insert element is rotationally symmetrical and suitably coaxially inserted in the central tube.

The insert element suitably is hollow. The hollow insert element can have a closure at its upper and/or lower end.

The invention will now be described in more detail with reference to the accompanying drawing, which is a schematic longitudinal section of a cyclone according to the present invention in the axial direction.

The cyclone illustrated in the drawing comprises a cyclone chamber 1 of circular cross-section and having a vertical axis. A horizontal inlet pipe 2, which forms an upper gas flow inlet, extends substantially tangentially into the cyclone chamber 1 in the upper portion thereof. A fan (not shown) is arranged to inject, via the inlet pipe 2, a dust-containing gas flow F, for example an air flow containing fibres, into the cyclone chamber 1.

The cyclone chamber 1 comprises, in the shown embodiment, a circular-cylindrical portion 3, a truncated conical portion 4, which is connected to the lower part of the circular-cylindrical portion 3, a circular-cylindrical portion 5, which is connected to the lower part of the truncated conical portion 4, and a truncated conical portion 6, which is connected to the upper part of the circular-cylindrical portion 3 and forms the top of the cyclone chamber 1. The cyclone chamber portions 3, 4, 5 and 6 are coaxially arranged. The lower portion 5 forms a lower dust outlet for removing dust or particles, e.g. fibres, which are separated from the gas flow in the cyclone chamber 1.

A central tube 7 of circular cross-section is coaxially arranged in the circular-cylindrical portion 3 of the cyclone chamber 1 and extends, via the truncated conical portion 6 thereof, out of the cyclone chamber 1. The central tube 7 comprises a circular-cylindrical tubular portion 8 and, connected to the lower end thereof, a truncated conical tubular portion 9. The central tube 7 forms at its lower end a lower gas flow inlet and at its upper end an upper gas flow outlet.

The cyclone as described so far is of the conventional type. Its function thus is well-known to the expert and will therefore not be described in more detail.

An elongate insert element 10 of circular cross-section is coaxially arranged in the central tube 7. The insert element 10 comprises a circular-cylindrical tubular portion 11 and, connected to the lower end thereof, a conical portion 12. The upper end of the tubular portion 11 and the lower end of the conical portion 12, i.e. the tip of the cone, are positioned on the same level as the upper and lower end, respectively, of the central tube 7. The transition between the portions 8 and 9 of the central tube 7 and the transition between the portions 11 and 12 of the insert element 10 are positioned on substantially the same level.

The insert element has at its upper end a conical closure part 13, which projects above the upper end of the central tube 7. The cone angle of the closure part 13 is about 90°.

The insert element 10 is attached in the central tube 7 by means of three sets of intersecting radial arms 14, 15, 16, which are connected to the central tube 7, viz. a set of upper arms 14, which are connected to the insert element 10 at the transition between the tubular portion 11 and the closure part 13 thereof, a set of intermediate arms 15, which are connected to the insert element 10 at the transition between the two portions 11 and 12 thereof, and a set of lower arms 16, which are connected to the insert element 10 at the lower end thereof, i.e. at the tip of the cone.

The insert element 10 is so dimensioned and so arranged in the central tube 7 that a circumferential gap 17 exists between the insert element 10 and the central tube 7. The dimensions of this gap 17 in the upper part of the central tube 7, i.e. between the circular-cylindrical tubular portions 8 and 11 of the central tube 7 and the insert element 10, are, in the embodiment illustrated, given by the ratio of the diameter $D_1$ of the tubular portion 11 to the diameter $D_2$ of the tubular portion 8, to which suitably applies that $0.3<D_1/D_2<0.9$, especially $0.63<D_1/D_2<0.73$. The truncated conical tubular portion 9 of the central tube 7 and the conical portion 12 of the insert element 10 have such cone angles that the cross-sectional area of the gap 17 is substantially constant over the entire length of the portions 9 and 12 and, thus, over the entire length of the central tube 7 and the insert element 10.

By using an insert element 10 in the manner described above, it has been possible to eliminate the vibration problems which in prior art cyclones are caused by the PVC phenomenon mentioned by way of introduction.

In the shown embodiment, the two portions 11 and 12 of the insert element 10 together extend over the entire length of the central tube 7. However, this is not necessary. The essential thing is that the tubular portion 11 of the insert element 10 extends downwards in the central tube 7 from the level of the upper end thereof, as shown in the drawing, or from a slightly higher level, whose distance to the level of the upper end of the central tube 7 suitably is not greater than $3 D_2$. To the total length of the insert element 10, excluding the conical closure part 13, but including that part of the circular-cylindrical tubular portion 11 which optionally projects above the upper end of the central tube 7 (this part being zero in the shown example), i.e. to $L_1+L_2$, wherein $L_1$ is the length of the tubular portion 11 and $L_2$ is the length of the conical portion 12, the following suitably applies: $L_1+L_2>3.0\ D_2$, especially $L_1+L_2>3.55\ D_2$.

The cyclone described above can be modified in various ways within the scope of the invention. Thus, the insert element 10 need not be provided with closure parts, such as the closure part 13 and the lower closure part formed of the conical portion 12, but it may have the shape of a pipe open at one or both ends. The insert element 10 can also be a solid body. Moreover, the insert element may consist of a circular-cylindrical portion only, or a conical portion or a truncated conical portion. It should also be noted that a satisfactory function can also be obtained if the insert element 10 is not rotationally symmetrical and/or if the insert element is not quite coaxially or quite symmetrically arranged in the central tube 7. As is evident from that stated above, the gap 17 can have a fairly arbitrary shape, provided that it is circumferential. However, it should be emphasised that the gap is not allowed to have such a shape that the cross-sectional area increases in the direction of the gas flow in the gap, i.e. upwards. It is thus essential to avoid a pressure recovery of the gas flowing through the gap.

We claim:

1. A cyclone for treating a gas flow containing dust, comprising.
   a cyclone chamber of circular cross-section, the cyclone chamber having a vertical axis, the chamber having a gas flow inlet for injection of a gas flow into the cyclone chamber substantially horizontally relative to the vertical axis, and a lower dust outlet for removing dust separated from the gas flow in the cyclone chamber;
   a central tube of circular cross-section, the central tube being coaxially arranged in an upper portion of the cyclone chamber, a lower end of the central tube forming a lower gas flow inlet and an upper end of the central tube forming an axially arranged upper gas flow outlet; and
   an elongate insert element the elongate insert element being vertically inserted in the central tube and extending downwardly in the central tube to define, with the central tube, a circumferential gap through which the gas flow flows to the upper gas flow outlet, the gap having a non-increasing cross-sectional area in a direction of the gas flow, and wherein a total length of the insert element is greater than three times a diameter of the central tube.

2. The cyclone as claimed in claim 1, wherein the gap has a substantially constant cross-sectional area.

3. The cyclone as claimed in claim 1, wherein the insert element projects above the central tube.

4. The cyclone as claimed in claim 1, wherein the insert element extends downwards to the lower end of the central tube.

5. The cyclone as claimed in claim 1, wherein the insert element is rotationally symmetrical.

6. The cyclone as claimed in claim 5, wherein the insert element and the central tube are coaxially arranged.

7. The cyclone as claimed in claim 1, wherein the insert element is hollow.

8. The cyclone as claimed in claim 7, wherein the insert element includes a closure at an upper end thereof.

9. The cyclone as claimed in claim 7, wherein the insert element includes a conical closure at a lower end thereof.

10. The cyclone as claimed in claim 2, wherein the insert element projects above the central tube.

11. The cyclone as claimed in claim 2, wherein the insert element extends downwards to the lower end of the central tube.

12. The cyclone as claimed in claim 3, wherein the insert element extends downwards to the lower end of the central tube.

13. The cyclone as claimed in claim 10, wherein the insert element extends downwards to the lower end of the central tube.

14. The cyclone as claimed in claim 2, wherein the insert element is rotationally symmetrical.

15. The cyclone as claimed in claim 3, wherein the insert element is rotationally symmetrical.

16. The cyclone as claimed in claim 4, wherein the insert element is rotationally symmetrical.

17. The cyclone as claimed in claim 2, wherein the insert element is hollow.

18. The cyclone as claimed in claim 3, wherein the insert element is hollow.

19. The cyclone as claimed in claim 4, wherein the insert element is hollow.

20. The cyclone as claimed in claim 8, wherein the insert element includes a conical closure at a lower end thereof.

* * * * *